US012605942B2

(12) United States Patent
Takita

(10) Patent No.: US 12,605,942 B2
(45) Date of Patent: Apr. 21, 2026

(54) METHOD FOR MANUFACTURING GOLF BALL HAVING MARKINGS

(71) Applicant: BRIDGESTONE SPORTS CO., LTD., Tokyo (JP)

(72) Inventor: Tasuku Takita, Sekishi (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 287 days.

(21) Appl. No.: 18/471,801

(22) Filed: Sep. 21, 2023

(65) Prior Publication Data

US 2024/0115908 A1 Apr. 11, 2024

(30) Foreign Application Priority Data

Oct. 7, 2022 (JP) ................................. 2022-162147

(51) Int. Cl.

*B41J 3/407* (2006.01)
*A63B 45/02* (2006.01)
*A63B 37/00* (2006.01)

(52) U.S. Cl.

CPC ........... *B41J 3/40733* (2020.08); *A63B 45/02* (2013.01); *A63B 37/0074* (2013.01); *B41J 3/407* (2013.01); *B41J 3/4073* (2013.01)

(58) Field of Classification Search

CPC ...... B41J 3/40733; B41J 3/407; B41J 3/4073; A63B 45/02; A63B 37/0074

See application file for complete search history.

(56) References Cited

U.S. PATENT DOCUMENTS 6,245,386 B1 * 6/2001 Felker ................ A63B 37/0022 427/407.1
2013/0165269 A1 * 6/2013 Molinari ............ A63B 37/0064 473/378

FOREIGN PATENT DOCUMENTS

JP 8-322967 A 12/1996
JP 2004-215917 A 8/2004
JP 2019-199041 A 11/2019

* cited by examiner

*Primary Examiner* — Henok D Legesse
(74) *Attorney, Agent, or Firm* — Sughrue Mion, PLLC

(57) ABSTRACT

A method is provided for manufacturing golf balls having markings of excellent definition and durability printed on the surface thereof. The method includes the steps of:

(1) applying at least one treatment selected from the group consisting of corona discharge treatment, ultraviolet irradiation treatment, chlorine treatment and primer coating treatment to the surface of a golf ball;
(2) forming a sublayer at a place on the treated surface of the golf ball that corresponds to the marking; and
(3) forming the marking on the sublayer by inkjet printing.

6 Claims, 4 Drawing Sheets

METHOD FOR MANUFACTURING GOLF BALL HAVING MARKINGS

CROSS-REFERENCE TO RELATED APPLICATIONS

This non-provisional application claims priority under 35 U.S.C. § 119(a) on Patent Application No. 2022-162147 filed in Japan on Oct. 7, 2022, the entire contents of which are hereby incorporated by reference.

TECHNICAL FIELD

The present invention relates to a method of manufacturing golf balls which includes the step of forming markings on the surface of a golf ball. More particularly, the invention relates to a method of manufacturing golf balls which is able to form markings of excellent definition and durability.

BACKGROUND ART

Processes such as transfer film printing and pad printing have hitherto been used to print markings on golf balls, but each of these processes has its drawbacks.

The transfer film process is expensive, cannot handle large sizes and is unsuitable for small lots. The pad printing process requires the same number of inks and intaglio plates as the number of colors in the markings, and so fabricating the plates and color matching the inks takes a lot of time and effort.

Ink jet printing has a number of advantages. For example, design changes are easy (enabling small lots to be handled), detailed designs are possible (that is, fine line printing can be carried out), larger diameters can be accommodated, and color matching/cleaning is unnecessary. However, when an attempt is made to actually print markings on the surface of a golf ball by an inkjet process, bleeding occurs, lowering the print quality, and the durability also decreases.

In particular, when a urethane resin is used as the cover resin material in a golf ball, the ink infiltrates the urethane resin and readily bleeds, as a result of which the markings are incapable of being detailed designs. When an ionomer resin is used as the cover resin material in golf balls, the ink tends to crawl rather than infiltrating the ionomer resin. In cases where the markings are printed after flash has been trimmed from the golf ball, bleeding readily occurs because the ball surface to be printed, particularly the lands on the ball surface where dimples have been formed, are rough. Given that golf balls are hit at a high speed and undergo large deformation, there is a desire for the ball to have a durability that withstands such deformation. Yet, the UV-curable inks normally used in inkjet printing are fragile, and markings printed with such inks lack sufficient durability.

Prior-art literature relating to methods of forming markings on the surface of golf balls include JP-A H08-322967, which discloses a method wherein pretreatment that includes primer application is carried out, following which the ball surface is marked with an inkjet printer. JP-A 2019-199041 describes art that uses a radiation-curable ink to print markings after the ball surface has been acid-treated to strengthen adhesion of the markings. JP-A 2004-215917 describes art in which a layer for strengthening the adhesion of markings is provided as a sublayer for the markings. However, none of this prior art achieves both good definition and good durability in markings formed on the surface of golf balls. Moreover, even when, as in JP-A H08-322967, a primer is applied as pretreatment onto a golf ball surface where markings are to be formed, problems remain with the durability of the markings when the ball is struck and with the reproducibility of the color of the ball cover. As for the methods of forming markings in such prior art, particularly in golf balls having a cover made of urethane resin, when an effort is made to form markings by inkjet printing after the ball surface has been trimmed, the ink bleeds out and so the markings during printing lack sufficient definition.

SUMMARY OF THE INVENTION

It is therefore an object of the present invention to provide a method of manufacturing golf balls in which markings printed on the surface of a golf ball have both an excellent definition and an excellent durability.

As a result of intensive investigations, I have found that, in a method of manufacturing a golf ball having a marking on the ball surface, by including the steps of: (1) applying at least one treatment selected from the group consisting of corona discharge treatment, ultraviolet irradiation treatment, chlorine treatment and primer coating treatment to the surface of a golf ball; (2) forming a sublayer at a place on the treated surface of the golf ball that corresponds to the marking; and (3) forming the marking on the sublayer by inkjet printing, the marking printed onto the ball surface has an excellent definition and also has an excellent durability. In particular, Step (2) forms a sublayer at a place that corresponds to the marking to be formed on the ball surface, which prevents the ink of the marking that has been printed on the ball surface from bleeding out, giving a marking that has a good definition.

Accordingly, the present invention provides a method of manufacturing a golf ball having on a surface thereof a marking of a predetermined shape, which method includes the steps of:

(1) applying at least one treatment selected from the group consisting of corona discharge treatment, ultraviolet irradiation treatment, chlorine treatment and primer coating treatment to the surface of a golf ball;

(2) forming a sublayer at a place on the treated surface of the golf ball which corresponds to the marking; and (3) forming the marking on the sublayer by inkjet printing.

In a preferred embodiment of the golf ball manufacturing method of the invention, the sublayer in Step (2) is formed by inkjet printing. In this embodiment, the ink for forming the sublayer and the ink used in Step (3) may be of the same type. In Step (2), the sublayer formed may be transparent. In Step (2), the print density within the region where the sublayer is formed may be from 0 to 100%. In Step (2), the volume per droplet in the sublayer may be from 1 to 15 picoliters.

In another preferred embodiment of the inventive method, the sublayer formed in Step (2) is transparent.

In yet another preferred embodiment, in Step (2), the sublayer is formed only at a peripheral edge of the marking in such manner as to follow the shape of the marking.

In still another preferred embodiment, the golf ball has a core and a cover, the cover being formed primarily of a urethane resin.

Advantageous Effects of the Invention

The inventive method of manufacturing golf balls is able to produce golf balls in which markings printed on the ball surface have both an excellent definition and an excellent durability.

DETAILED DESCRIPTION OF THE INVENTION

The objects, features and advantages of the invention will become more apparent from the following detailed description taken in conjunction with the appended diagrams.

The inventive method of manufacturing a golf ball having a surface marking includes the following three steps:

(1) applying at least one treatment selected from the group consisting of corona discharge treatment, ultraviolet irradiation treatment, chlorine treatment and primer coating treatment to the surface of a golf ball;

(2) forming a sublayer at a place on the treated surface of the golf ball which corresponds to the marking; and (3) forming the marking on the sublayer by inkjet printing.

Step (1) carries out treatment to increase adhesion between the ball surface and the ink of the marking and thereby improve the marking durability. This treatment is selected from the group consisting of corona discharge treatment, ultraviolet irradiation treatment, chlorine treatment and primer coating treatment. These ball surface treatment methods are known techniques. For more details, reference can be made to the prior art described in JP-A H08-322967.

Step (2) is the step of forming a sublayer at a place which corresponds to the marking that is ultimately formed on the ball surface, and is provided in order to prevent the ink of the marking from bleeding out onto the ball surface and to impart sufficient definition to the marking. In Step (2), it is preferable for the sublayer to be formed by inkjet printing. This is because, the step of forming the marking by inkjet printing being essential to the present invention, by using inkjet printing to form the sublayer in the same manner as the marking, the same equipment can be used, resulting in improved production efficiency. Also, by using inkjet printing to form the sublayer, it is possible to adjust downsampling (dot removal) in the printed region and the volume (size) of the ink droplets, and by adjusting the region where the sublayer covers the ball surface (print density), the definition and durability of the marking can be brought to outstanding levels.

Figure 1:
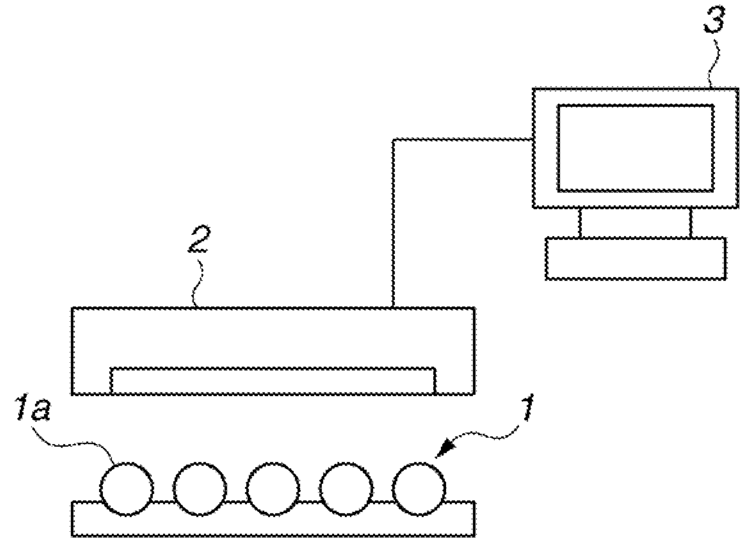
FIG. 1 is a schematic diagram showing a personal computer and an inkjet printer configured for printing sublayers and markings on the surfaces of golf balls.

FIG. 1 is a schematic diagram showing the manner in which sublayers and markings are printed onto the surfaces of a plurality of golf balls using a personal computer and an inkjet printer. In this case, the place just above the surface 1*a* of each golf ball 1 corresponds to where a sublayer is to be formed and where a marking (printed layer) is to be printed. A personal computer 3 is connected to an inkjet printer 2 in order to control the inkjet printer settings. Exemplary inkjet printers include continuous (charge control-type, continuous jetting-type) inkjet printers, drop-on-demand (pressure pulse-type) inkjet printers and intermittent (field control-type, intermittent jetting-type) inkjet printers, although any type of inkjet printer may be used. In this invention, it is preferable to use a UV inkjet printer. Commercially available inkjet printers may be used, such as the KJ4A series printers from Kyocera Corporation.

Figure 2A:
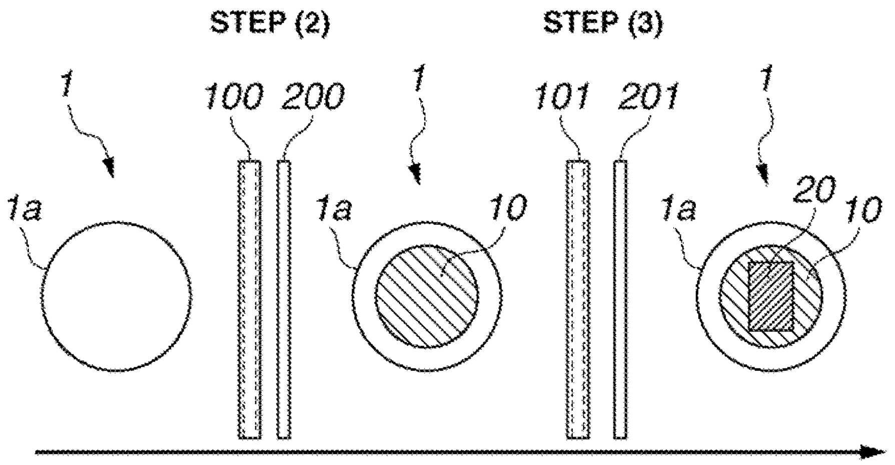
FIGS. 2A and 2B are a pair of schematic explanatory diagrams illustrating the manner in which a sublayer and a marking (printed layer) are consecutively formed by an ink head and a UV irradiation unit, FIG. 2A showing views of the ball from directly overhead and FIG. 2B showing lateral views of the ball.
Figure 2B:
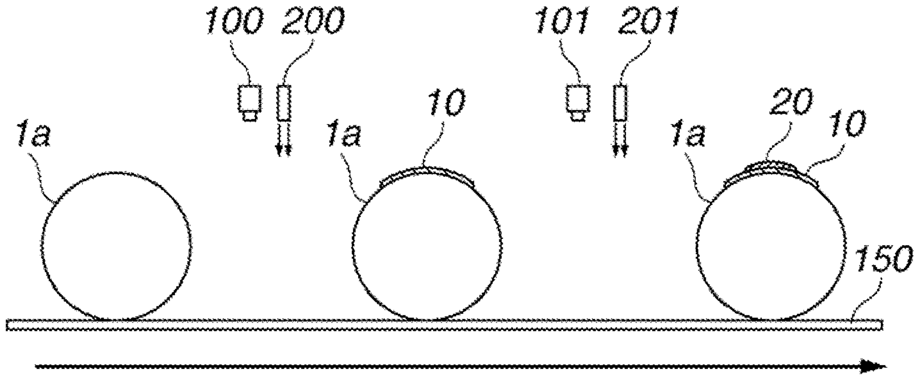

FIGS. 2A and 2B are a pair of schematic explanatory diagrams illustrating the manner in which, while the ball is moved, a sublayer 10 is formed on the ball surface by an ink head and a UV irradiation unit and, additionally, a marking (printed layer) is formed on the ball by another ink head and another UV irradiation unit. FIG. 2A shows views of the ball from directly overhead and FIG. 2B shows lateral views of the ball. In FIGS. 2A and 2B, by thus installing ink heads and UV irradiation units at two places within a single UV inkjet printer, the sublayer and the marking (printed layer) can be successively formed while moving the ball in one direction by a moving means such as a conveyor belt. The arrows in FIGS. 2A and 2B show the direction of ball movement and the reference number 150 denotes the moving means. This invention is not limited to using a UV inkjet printer like that described above; during formation of the sublayer and the marking (printed layer), the sublayer and the marking (printed layer) may be separately formed using a different UV inkjet printer for each.

As shown in FIGS. 2A and 2B, a sublayer 10 is formed at a place on the ball surface 1*a* that corresponds to the marking. That is, ink is jetted from an ink head 100 of the inkjet printer to a predetermined position on the ball surface 1*a*, and the ink (ink composition) is UV cured immediately thereafter by a UV irradiation unit 200, thereby forming an ink layer. Although the type of ink is not particularly limited, it is preferable to use a UV-curable ink composition, specifically an ink composition for UV-curable inkjet printing that contains a photopolymerizable methacrylic or acrylic monomer and a photopolymerization initiator.

To make the printed mark (printed layer) even clearer, it is desirable for the sublayer to be transparent. In this case, it is preferable for a clear ink composition containing no color pigment to serve as the ink composition used in the sublayer. Aside from not including any color pigment, the UV-curable ink composition used in the sublayer and the ink composition used in the marking (printed layer) are preferably of the same type.

Figure 3:
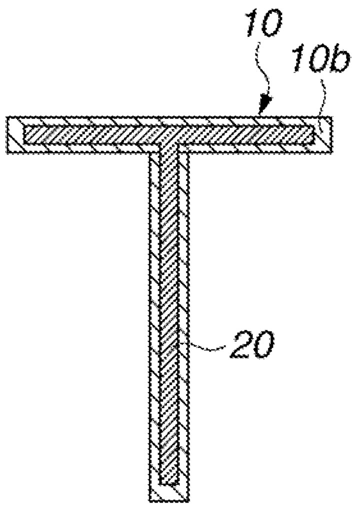
FIG. 3 is a schematic diagram showing the manner in which a sublayer forming region is limited to the peripheral edge of a T-shaped marking.

The role of the sublayer that has been formed on the ball surface is to cover places where ink bleed occurs when the subsequently described marking is formed. As shown in FIGS. 2A and 2B, it is enough for the region of the sublayer 10 formed on the ball surface 1*a* to be wider than the region of the marking 20 (printed layer). Alternatively, the region of the sublayer 10 may be limited to the borders of a shape similar to the marking. For example, as shown in FIG. 3, by having the region where the sublayer is formed consist only of the peripheral edge 10*b* of a marking (in the diagram, the letter T), this peripheral edge 10*b* becomes a wall, enabling bleeding or infiltration of the ink onto the ball surface to be suppressed. In addition, when the shape of the sublayer is limited to the peripheral edge of the mark, the sublayer can be easily formed by inkjet printing, which is desirable in terms of durability and cost.

In Step (2), the region where the sublayer is formed has a print density therein of from 0 to 100%. The marking (print layer) formed by inkjet printing is decimated within the region of the sublayer by downsampling (dot removal) or by adjusting the droplet volume for the ink that forms this sublayer. As a result, the ink comes into direct contact, through spaces where ink has not been applied, with the ball surface treated in Step (1), increasing adhesion between the ball surface and the ink of the marking (printed layer) and thus improving marking durability (adherence). Should the print density of the sublayer fall below 20%, adhesion between the ball surface and the ink of the marking will rise but the ink bleed-suppressing effect by the sublayer may decrease. On the other hand, should the print density of the sublayer exceed 80%, the ink bleed-suppressing effect rises, but adhesion between the ball surface and the ink of the marking (printed layer) may end up decreasing. Hence, in terms of the ink bleed-suppressing effect and the marking durability, it is desirable to suitably adjust the print density of the sublayer.

Figure 4:
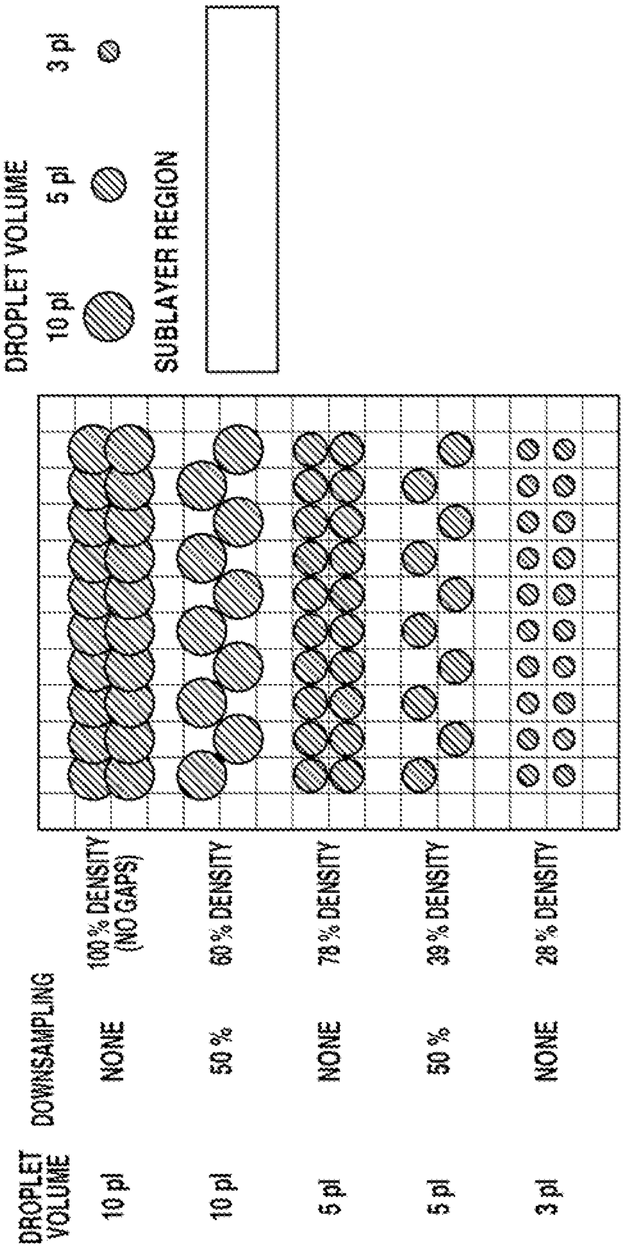
FIG. 4 is an explanatory diagram showing the relationship between ink droplets (size) and downsampling (dot removal).

FIG. 4 is an explanatory diagram showing the relationship between the ink droplets (size) and downsampling (dot removal). As shown in FIG. 4, the print density is suitably adjusted by the ink droplet volume and downsampling (dot removal). For example, referring to the explanatory diagram in FIG. 4, a print density of 100% is an embodiment in which ink droplets are arranged without gaps in a sublayer region. In this case, by using large ink droplets having a volume of 10 picoliters (pL) and placing one droplet in each dot within the sublayer region, the ink droplets within this region can be arranged in a densely packed state without gaps. Using 10 pL ink droplets, a print density of 60% can be achieved by adjusting the number of 10 pL ink droplets to one-half that used at a print density of 100% (that is, by setting the downsampling ratio to 50%). Using 5 pL ink droplets, a print density of 78% can be achieved by placing one droplet in each dot within the region. Using 5 pL ink droplets, a print density of 39% can be achieved by adjusting the number of 5 pL ink droplets to one-half that used at a print density of 78% (that is, by setting the downsampling ratio to 50%). Using small ink droplets having a volume of 3 pL, a print density of 28% can be achieved by placing one droplet in each dot within the region. Because the ink droplets are spherical, even without setting the downsampling ratio, gaps where ink is not printed will of course arise when the spherical volume is small. Hence, the desired print density can be adjusted by suitably selecting the volume and downsampling ratio of the ink droplets that are used.

Regarding the above adjustment of the ink droplet volume and the downsampling ratio, these parameters can be suitably selected according to the inkjet printer settings and conditions, this being possible using a controller built directly into the inkjet printer or using application software on a computer connected to the printer.

The sublayer print density is preferably at least 20%, more preferably at least 25%, and even more preferably at least 30%. The upper limit is preferably 100%, more preferably 80% or less, and even more preferably 70% or less. As used herein, "print density" refers to, out of 100% of the surface area of the sublayer region, the ratio of the sublayer surface area onto which the marking is printed.

The volume per sublayer droplet is preferably at least 1 pL, more preferably at least 2 pL, and even more preferably at least 3 pL. The upper limit is preferably 15 pL or less, more preferably 10 pL or less, and even more preferably 6 pL or less. When the volume of the ink droplets used in the sublayer is too large, even if there is a bleed-suppressing effect, separation among the ink droplets arises, leading to droplet breakup, as a result of which the durability of the marking and the durability of the sublayer itself may be somewhat diminished. On the other hand, when the ink droplets are too small, it may be impossible to reliably print the marking at the intended position due to external effects such as air currents, which may lead to worsening of the marking durability and to ink bleed.

Step (3) is the step of forming a marking by inkjet printing. The marking (printed layer) is formed within the region where the sublayer is formed or along the shape of the sublayer. As shown in FIGS. 2A and 2B, ink is jetted from the ink head 101 of an inkjet printer and onto a predetermined position on the ball surface 1*a*, forming the marking (printed layer) 20. Immediately thereafter, the ink (ink composition) is UV cured by a UV irradiation unit 201. The type of ink is not particularly limited, although the use of a UV-curable ink composition, specifically an ink composition for UV-curable inkjetting that includes the desired color pigment, a photopolymerizable methacrylic or acrylic monomer and a photopolymerization initiator is preferred.

The type, position and number, etc. of markings are not particularly limited. Markings such as letters, numbers, trade names and logos can be applied at any position on the surface of the ball.

The cover is the layer formed on the outermost side of the golf ball, and normally has numerous dimples formed on the surface thereof. This cover is described in detail below.

A thermoplastic resin or a thermoplastic elastomer may be suitably used as the base resin in the material that forms the cover. Specific examples of thermoplastic resins include ionomer resins. A commercial product may be used as the ionomer resin. Products such as those available under the trade names Himilan™ (Dow-Mitsui Polychemicals Co., Ltd.), Surlyn™ (DuPont de Nemours, Inc.) and Iotek® (ExxonMobil Chemical Company) may be used in this invention. Specific examples of thermoplastic elastomers include polyester-based, polyamide-based, polyurethane-based, olefin-based and styrene-based thermoplastic elastomers. Commercial products may be used as these thermoplastic elastomers. Products such as those available under the trade names Hytrel® (DuPont-Toray Co., Ltd.), Pelprene™ (Toyobo Co., Ltd.), Pebax® (Toray Industries, Inc.), Pandex® (DIC Covestro Polymer, Ltd.), Santoprene® (Monsanto Chemical Co.), Tuftec™ (Asahi Chemical Industry Co., Ltd.) and Dynaron (JSR Corporation) may be used. In this invention, it is preferable to use an ionomer resin or a thermoplastic polyurethane elastomer as the above thermoplastic resin or thermoplastic elastomer.

A known method may be used to obtain the cover. For example, a method may be used in which, depending on the type of ball, a prefabricated single-layer core or multilayer core of two or more layers is placed within a mold, and a cover-forming resin material is injection-molded over the core to obtain the desired cover. Alternatively, the cover-forming method used may be one in which, for example, a pair of hemispherical half-cups is molded beforehand of a cover stock, the core is enclosed within these half-cups, and molding under applied pressure is carried out at between 120° C. and 170° C. for a period of 1 to 5 minutes.

The construction of the golf ball produced according to this invention is similar to that of conventional golf balls and not particularly limited. For example, the ball may be a two-piece solid golf ball consisting of a cover formed over a core, or may be a multipiece solid golf ball having a construction of three or more pieces in which one or more intermediate layer is formed between the core and the cover.

The core can be obtained by vulcanizing a rubber composition composed primarily of a rubber material. Specifically, use can be made of a rubber composition containing a base rubber such as polybutadiene, a crosslinking initiator and a co-crosslinking agent.

One, two or more intermediate layers may be molded between the core and the cover serving as the outermost layer. In this case, a thermoplastic resin such as an ionomer may be suitably used as the intermediate layer material.

In this invention, a coating layer is formed on the cover surface. A two-part curable urethane coating is preferably used as the coating that forms this coating layer. Specifically, in this case, the curable two-part urethane coating is one that includes a base resin composed primarily of a polyol resin and a curing agent composed primarily of a polyisocyanate. A known method may be used without particular limitation as the method for applying this coating onto the cover surface and forming a coating layer. Use can be made of a desired method such as air gun painting or electrostatic painting.

EXAMPLES

The following Examples and Comparative Examples are provided to illustrate the invention, and are not intended to limit the scope thereof.

Examples 1 to 7, Comparative Examples 1 to 3

Cores having a diameter of 38.6 mm were produced by using a rubber blend in which polybutadiene serves as the chief ingredient to prepare a core composition, and then vulcanizing the composition.

A resin composition composed primarily of an ionomer resin was then injection-molded over the core surface to form an intermediate layer having a thickness of 1.25 mm. Next, using a different injection mold, a resin material composed primarily of a thermoplastic polyurethane elastomer (an ether-type polyurethane elastomer available under the trade name Pandex from DIC Covestro Polymer, Ltd.) was injection-molded over the resulting intermediate layer-encased sphere to form a cover having a thickness of 0.8 mm, thereby producing a three-piece solid golf ball having a diameter of 42.7 mm.

Examples 8 to 12, Comparative Examples 4 to 6

Cores having a diameter of 37.3 mm were produced by using a rubber blend in which polybutadiene serves as the chief ingredient to prepare a core composition, and then vulcanizing the composition.

A resin composition composed primarily of an ionomer resin was then injection-molded over the core surface to form an intermediate layer having a thickness of 1.45 mm. Next, using a different injection mold, a resin material composed primarily of an ionomer resin (available under the trade name Himilan from Dow-Mitsui Polychemicals Co., Ltd.) was injection-molded over the resulting intermediate layer-encased sphere to form a cover having a thickness of 1.25 mm, thereby producing a three-piece solid golf ball having a diameter of 42.7 mm.

Markings were formed via Steps (1) to (3) below on the cover surfaces of the golf balls produced as described above.

Step (1)

Either "primer+corona" treatment or corona treatment was carried out in the respective examples in Tables 1 and 2. The treatment was carried out under varying conditions. In the case of "primer+corona" treatment, a primer was applied and then dried, following which corona treatment was carried out. The primer used was "Clearbond+Plus Multi" from Somay-Q Technology, Inc. Corona treatment was carried at a power output of 1,000 W and an irradiation time of 2 seconds using the PS-1200 AW from Wedge KK.

Step (2)

A sublayer was formed by carrying out inkjet printing using a UV-curable ink. The sublayer was printed in a region that was set so as to be larger than the marking. The printer used for this inkjet printing was the KJ4A-AA from Kyocera Corporation. UV curing was carried out at a UV irradiation intensity of 1,800 mW/cm$^2$, an irradiation time of 2 seconds and a wavelength of 385 nm. The UV-curable ink used was UV IJ Ink from T&K Toka Co., Ltd. The inkjet printing conditions (print density, droplet volume) are shown in Tables 1 and 2. The print density and droplet volume during printing were set using dedicated software.

Step (3)

A marking was formed by inkjet printing using a UV-curable ink. The inkjet printing conditions (print density, droplet volume) are shown in Tables 1 and 2.

The UV-curable ink and UV curing conditions were the same as for the UV-curable ink used in Step (2).

After Step (3) was carried out, a two-part curable polyurethane coating composition was applied onto the entire surface of the ball using an air spray gun, thereby producing a golf ball having a 15 μm thick coating layer formed thereon.

The following evaluations were carried out on each of the resulting golf balls. The results are shown in Tables 1 and 2.

Definition (Bleeding)

The definition of the markings after coating application was rated on the following scale. The average values for a panel of five judges are shown in Tables 1 and 2.

5 points: No bleeding whatsoever 3 points: Slight bleeding is observable 1 point: Bleeding is clearly observable.

Durability

The appearance of the markings following an abrasion test using sand or sand and water was evaluated. A pot mill having an outside diameter of 210 mm was charged with about 4 kg of sand having a grain size of about 5 mm and water, following which 15 golf balls were charged into the pot mill. The pot mill was then stirred for 120 minutes at a rotational speed of 50 to 60 rpm. The balls were subsequently removed from the pot mill and the appearance of the markings was rated on the following scale. The average values for a panel of five judges are shown in Tables 1 and 2.

5 points: No peeling or loss of the markings.

3 points: Slight peeling or loss of markings is observable, but of an acceptable degree.

1 point: Peeling or loss of markings are conspicuous.

TABLE 1

| | | | Comparative Example | | | Example | | | | | | |
|---|---|---|---|---|---|---|---|---|---|---|---|---|
| | | | 1 | 2 | 3 | 1 | 2 | 3 | 4 | 5 | 6 | 7 |
| Specifications | Core | | core (diameter, 38.6 mm) | | | | | | | | | |
| | Intermediate layer | Material | ionomer resin (Shore D hardness, 65) | | | | | | | | | |
| | Cover | Material | urethane resin (Shore D hardness, 40) | | | | | | | | | |
| Marking Steps | Step (1) | Printing method | none | primer + corona | corona | corona | corona | corona | corona | corona | corona | corona |
| | Step (2) | Treatment method | none | none | none | inkjet | inkjet | inkjet | inkjet | inkjet | inkjet | inkjet |
| | | Print density (%) | — | — | — | 100 | 100 | 100 | 100 | 50 | 30 | 20 |
| | | Droplet volume (pL) | — | — | — | 15 | 10 | 7 | 3 | 3 | 3 | 3 |
| | Step (3) | Printing method | inkjet | inkjet | inkjet | inkjet | inkjet | inkjet | inkjet | inkjet | inkjet | inkjet |
| | | Print density (%) | 100 | 100 | 100 | 100 | 100 | 100 | 100 | 100 | 100 | 100 |
| | | Droplet volume (pL) | 7 | 7 | 7 | 7 | 7 | 7 | 7 | 7 | 7 | 7 |
| Evaluation | Definition | Bleeding | 2.5 | 2.0 | 2.0 | 4.5 | 4.5 | 4.5 | 4.0 | 4.0 | 3.5 | 3.0 |
| | Durability | Sand | 4.0 | 3.5 | 4.0 | 3.0 | 3.0 | 3.5 | 4.0 | 4.0 | 4.0 | 4.0 |
| | | Sand and water | 4.0 | 3.5 | 4.0 | 3.0 | 3.0 | 3.5 | 4.0 | 4.0 | 4.0 | 4.0 |

As shown in Table 1, with regard to embodiments in which the markings are formed on the surfaces of covers made of a urethane resin, the durability is substantially similar in Examples 1 to 7 and Comparative Examples 1 to 3, but ratings of the definition of the markings are higher in Examples 1 to 7.

TABLE 2

| | | | Comparative Example | | | Example | | | | |
|---|---|---|---|---|---|---|---|---|---|---|
| | | | 4 | 5 | 6 | 8 | 9 | 10 | 11 | 12 |
| Specifications | Core | | core (diameter, 37.3 mm) | | | | | | | |
| | Intermediate layer | Material | ionomer resin (Shore D hardness, 54) | | | | | | | |
| | Cover | Material | ionomer resin (Shore D hardness, 57) | | | | | | | |
| Marking Steps | Step (1) | Treatment method | none | corona | primer + corona | primer + corona | primer + corona | primer + corona | primer + corona | primer + corona |
| | Step (2) | Printing method | none | none | none | inkjet | inkjet | inkjet | inkjet | inkjet |
| | | Print density (%) | — | — | — | 100 | 100 | 75 | 70 | 60 |
| | | Droplet volume (pL) | — | — | — | 7 | 3 | 3 | 3 | 3 |
| | Step (3) | Printing method | inkjet | inkjet | inkjet | inkjet | inkjet | inkjet | inkjet | inkjet |
| | | Print density (%) | 100 | 100 | 100 | 100 | 100 | 100 | 100 | 100 |
| | | Droplet volume (pL) | 7 | 7 | 7 | 7 | 7 | 7 | 7 | 7 |
| Evaluation | Definition | Bleeding | 3.0 | 2.0 | 2.0 | 4.5 | 4.0 | 4.0 | 3.5 | 3.0 |
| | Durability | Sand | 2.0 | 2.0 | 3.5 | 3.0 | 3.5 | 4.0 | 4.0 | 4.0 |
| | | Sand and water | 2.0 | 2.0 | 3.5 | 3.0 | 3.5 | 4.0 | 4.0 | 4.0 |

As shown in Table 2, with regard to embodiments in which the markings are formed on the surfaces of covers made of an ionomer resin, ratings of the definition and durability of the markings in Examples 8 to 12 are sufficiently high relative to those in Comparative Examples 4 to 6.

Japanese Patent Application No. 2022-162147 is incorporated herein by reference. Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of manufacturing a golf ball having on a surface thereof a marking of a predetermined shape, comprising the steps of:

(1) applying at least one treatment selected from the group consisting of corona discharge treatment, ultraviolet irradiation treatment, chlorine treatment and primer coating treatment to a surface of a golf ball;

(2) forming a sublayer at a place on the treated surface of the golf ball which corresponds to the marking; and (3) forming the marking on the sublayer by inkjet printing, wherein, in Step (2), the sublayer is formed by inkjet printing and the print density within the region where the sublayer is formed is from 20 to 80%.

2. The method of claim 1, wherein the ink for forming the sublayer and the ink used in Step (3) are of the same type.

3. The method of claim 1, wherein the sublayer formed in Step (2) is transparent.

4. The method of claim 1 wherein, in Step (2), the sublayer is formed only at a peripheral edge of the marking in such manner as to follow the shape of the marking.

5. The method of claim 1 wherein, in Step (2), the volume per droplet in the sublayer is from 1 to 15 picoliters.

6. The method of claim 1, wherein the golf ball has a core and a cover, the cover being formed primarily of a urethane resin.

* * * * *